United States Patent
Kim et al.

(10) Patent No.: US 8,514,834 B2
(45) Date of Patent: Aug. 20, 2013

(54) METHOD AND APPARATUS FOR RESOURCE ALLOCATION USING DIRECTIONAL BEAM IN WIRELESS NETWORK

(75) Inventors: Yong-Sun Kim, Chungcheongnam-do (KR); Woo-Yong Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 215 days.

(21) Appl. No.: 12/898,658

(22) Filed: Oct. 5, 2010

(65) Prior Publication Data

US 2011/0128952 A1 Jun. 2, 2011

(30) Foreign Application Priority Data

Nov. 30, 2009 (KR) .................. 10-2009-0116953

(51) Int. Cl.
*H04B 7/212* (2006.01)
*H04J 3/07* (2006.01)
*H04J 3/06* (2006.01)

(52) U.S. Cl.
USPC ........... 370/347; 370/235; 370/528; 370/527; 370/522; 370/508; 370/509; 370/521

(58) Field of Classification Search
USPC ................ 370/235, 347, 528, 527, 522, 508, 370/509, 521
See application file for complete search history.

(56) References Cited

U.S. PATENT DOCUMENTS

| 7,860,002 | B2* | 12/2010 | Lee et al. | 370/230 |
| 8,204,028 | B2* | 6/2012 | Kessleman et al. | 370/338 |
| 2008/0253287 | A1* | 10/2008 | Gupta et al. | 370/235 |
| 2009/0073954 | A1* | 3/2009 | Maltsev et al. | 370/347 |
| 2009/0111532 | A1* | 4/2009 | Salokannel et al. | 455/574 |
| 2009/0116444 | A1* | 5/2009 | Wang et al. | 370/329 |
| 2009/0310592 | A1* | 12/2009 | Kessleman et al. | 370/347 |
| 2010/0118835 | A1* | 5/2010 | Lakkis et al. | 370/336 |
| 2011/0032881 | A1* | 2/2011 | Lee | 370/328 |
| 2011/0119761 | A1* | 5/2011 | Wang et al. | 726/23 |

FOREIGN PATENT DOCUMENTS

| KR | 2009-0109285 A | 10/2009 |
| WO | WO-2009-128599 A1 | 10/2009 |

OTHER PUBLICATIONS

Cai et al., "Efficient Resource Management for mmWave WPANs", Published in the Wireless Communications and Networking Conference, Mar. 11-15, 2007, pp. 3819-3824.*

Lin X. Cai et al., "Efficient Resource Management for mmWave WPANs," Wireless Communications and Networking Conference, IEEE, pp. 3819-3824; Mar. 11-15, 2007.

* cited by examiner

*Primary Examiner* — Kamal B Divecha
*Assistant Examiner* — Juan Turriate
(74) *Attorney, Agent, or Firm* — Rabin & Berdo, P.C.

(57) ABSTRACT

A method and apparatus for allocating resources using a directional beam in a wireless communication network is provided. A coordinator device calculates the number of flows able to be concurrently transmitted with each flow that is generated between the nodes and a transmission time of the each flow, and groups together the flows based on the calculation result. In addition, the coordinator device allocates resources to the respective nodes such that the nodes which generate the flows belonging to the same group can transmit the flows concurrently. Thus, the amount of the overall concurrent transmission can be maximized.

15 Claims, 14 Drawing Sheets

FIG. 3

| FLOW NO. | TRANSMITTER COORDINATES | RECEIVER COORDINATES | TRANSMISSION TIME OF EACH FLOW(CTA) |
|---|---|---|---|
| 1 | 3.5627 + 2.5458i | 5.0923 + 0.7731i | 5 |
| 2 | 4.3332 + 3.2118i | 2.4529 + 2.7572i | 7 |
| 3 | 5.7942 + 2.7322i | 3.6557 + 4.1783i | 16 |
| 4 | 3.761 + 5.484i | 3.9364 + 3.2483i | 6 |
| 5 | 1.4289 + 5.1921i | 1.1066 + 0.356i | 22 |
| 6 | 3.2095 + 3.0425i | 3.9743 + 1.6171i | 4 |
| 7 | 3.0258 + 4.9056i | 4.913 + 5.8986i | 6 |
| 8 | 6.831 + 6.6837i | 3.0155 + 0.1106i | 29 |
| 9 | 4.3845 + 5.5454i | 5.9133 + 6.1074i | 29 |
| 10 | 4.9171 + 4.9891i | 5.1717 + 0.552i | 19 |

FIG. 6

$$\text{S\_Fgroup}=\begin{bmatrix} 8 & 9 & 5 & 3 \\ 10 & 0 & 0 & 0 \end{bmatrix}, \text{S\_CTA\_Fgroup}=\begin{bmatrix} 29 & 29 & 22 & 16 \\ 19 & 0 & 0 & 0 \end{bmatrix}$$

FIG. 7

$$\text{REX\_Table} = \begin{bmatrix} 0 & 1 & 1 & 0 & 1 & 0 & 1 & 0 & 1 & 0 & 5 \\ 1 & 0 & 1 & 0 & 1 & 0 & 1 & 1 & 1 & 0 & 6 \\ 1 & 1 & 0 & 0 & 1 & 1 & 0 & 1 & 1 & 0 & 6 \\ 0 & 0 & 0 & 0 & 1 & 0 & 0 & 1 & 0 & 0 & 2 \\ 1 & 1 & 1 & 1 & 0 & 1 & 1 & 1 & 1 & 1 & 9 \\ 0 & 0 & 1 & 0 & 1 & 0 & 1 & 1 & 1 & 1 & 6 \\ 1 & 1 & 0 & 0 & 1 & 1 & 0 & 1 & 0 & 0 & 5 \\ 0 & 1 & 1 & 1 & 1 & 1 & 1 & 0 & 1 & 0 & 7 \\ 1 & 1 & 1 & 0 & 1 & 1 & 0 & 1 & 0 & 1 & 7 \\ 0 & 0 & 0 & 0 & 1 & 1 & 0 & 0 & 1 & 0 & 3 \end{bmatrix}$$

FIG. 8

$$\text{New\_Fgroup} = \begin{bmatrix} 8 & 9 & 5 & 3 & 2 \\ 10 & 6 & 0 & 0 & 0 \end{bmatrix}, \text{New\_CTA\_Fgroup} = \begin{bmatrix} 29 & 29 & 22 & 16 & 7 \\ 19 & 4 & 0 & 0 & 0 \end{bmatrix}$$

FIG. 9

$$\text{Final\_Fgroup} = \begin{bmatrix} 8 & 9 & 5 & 3 & 2 \\ 10 & 6 & 0 & 0 & 0 \\ 7 & 1 & 0 & 0 & 0 \\ 4 & 0 & 0 & 0 & 0 \end{bmatrix}, \text{Final\_CTA\_Fgroup} = \begin{bmatrix} 29 & 29 & 22 & 16 & 7 \\ 19 & 4 & 0 & 0 & 0 \\ 6 & 5 & 0 & 0 & 0 \\ 6 & 0 & 0 & 0 & 0 \end{bmatrix}$$

METHOD AND APPARATUS FOR RESOURCE ALLOCATION USING DIRECTIONAL BEAM IN WIRELESS NETWORK

CROSS-REFERENCE TO RELATED APPLICATION

This application claims the benefit under 35 U.S.C. §119(a) of Korean Patent Application No. 10-2009-0116953, filed on Nov. 30, 2009, the entire disclosure of which is incorporated herein by reference for all purposes.

BACKGROUND

1. Field

The following description relates to a wireless communication network, and more particularly, to a resource allocation technique for a wireless communication network using a directional beam.

2. Description of the Related Art

A wireless personal area network (WPAN) refers to a wireless network in which devices arranged short distances from one another transceive data at low power. WPAN employs a time-division multiple access (TDMA) scheme for data communication. Specifically, WPAN may use millimeter wave (mm-wave) to ensure high-speed communication. The millimeter wave band (from 57 up to 66 GHz) is considered as a solution for overcoming the shortage of frequency resources. More attention has been paid to the mm-wave band since this band is unlicensed.

Particularly, the use of a mm-wave band, which is an ultra wideband, is growing with the increase of use of wireless applications requiring a high transmission rate, such as a wireless high-definition multimedia interface (HDMI), a wireless universal serial bus (USB), an Internet protocol television (IPTV)/video on demand (VoD), a 3-dimensional (3D) game, and an intelligent transportation system.

Additionally, the importance of efficient use of resources is increasing in the field of the wireless communication networks that employ millimeter waves. While resource scheduling can be easily carried out for a small amount of data to be processed, if the amount of data to be processed is increased, users are subject to experience transmission delay under any standards according to the resource scheduling. Thus efficient use of the resources is required. Specifically, the importance of the efficient use of resources is emphasized in the wireless communication network which uses a directional antenna.

SUMMARY

In one general aspect, provided is a method of a coordinator device allocating resources to a plurality of nodes using a directional beam in a wireless communication network, the method including: calculating the number of flows able to be transmitted concurrently with each flow which is generated between the nodes and transmission time of the each flow and grouping the flows that can be concurrently transmitted based on the calculation result; and allocating resources to the respective nodes such that the nodes which generate the flows belonging to the same group can concurrently transmit the flows.

The grouping of the flows may include: calculating the number of flows able to be transmitted concurrently with each flow that is generated between the nodes; and setting a priority based on the calculated number of flows able to be concurrently transmitted and the transmission time of each flow and grouping the flows that can be concurrently transmitted based on the set priority.

In another general aspect, provided is a method of data communications between a plurality of nodes using a directional beam in a wireless communication network, the method including: issuing a request to a coordinator device for flows to be generated between the nodes; in response to the request, the coordinator device calculating the number of flows able to be concurrently transmitted and a transmission time of each flow, grouping the flows that can be concurrently transmitted based on the calculation result, and allocating resources to the respective nodes such that the nodes which generate the flows belonging to the same group can transmit the flows concurrently; and performing data communications between the nodes using the allocated resources.

In yet another general aspect, provided is a coordinator device which allocates resources to a plurality of nodes using a directional beam in a wireless network, the coordinator device including: a flow grouping unit configured to calculate the number of flows able to be transmitted concurrently with each flow which is generated between the nodes and transmission time of the each flow and group together the flows that can be concurrently transmitted based on the calculation result; and a resource allocating unit configured to allocate resources to the respective nodes such that the nodes which generate the flows belonging to the same group can concurrently transmit the flows.

The flow grouping unit may group together some flows based on the number of flows able to be concurrently transmitted and the transmission time of each flow, and further group together the remaining flows by adding each of the remaining flows to a previously generated group and by using the number of flows able to be concurrently transmitted and the transmission time of each flow.

Other features and aspects will be apparent from the following detailed description, the drawings, and the claims.

BRIEF DESCRIPTION OF THE DRAWINGS

FIG. 3 is a table showing spatial coordinates of flows and transmission times of the flows.

FIG. 6 is an example of a matrix of a concurrent transmission group using a channel time allocation (CTA) for each flow.

FIG. 7 is a diagram illustrating an example of a concurrent transmission table.

FIG. 8 is an example of a matrix of a concurrent transmission group based on the possible concurrent transmission number of each flow.

FIG. 9 is an example of a matrix of a concurrent transmission group with respect to remaining flows.

Figure 1:
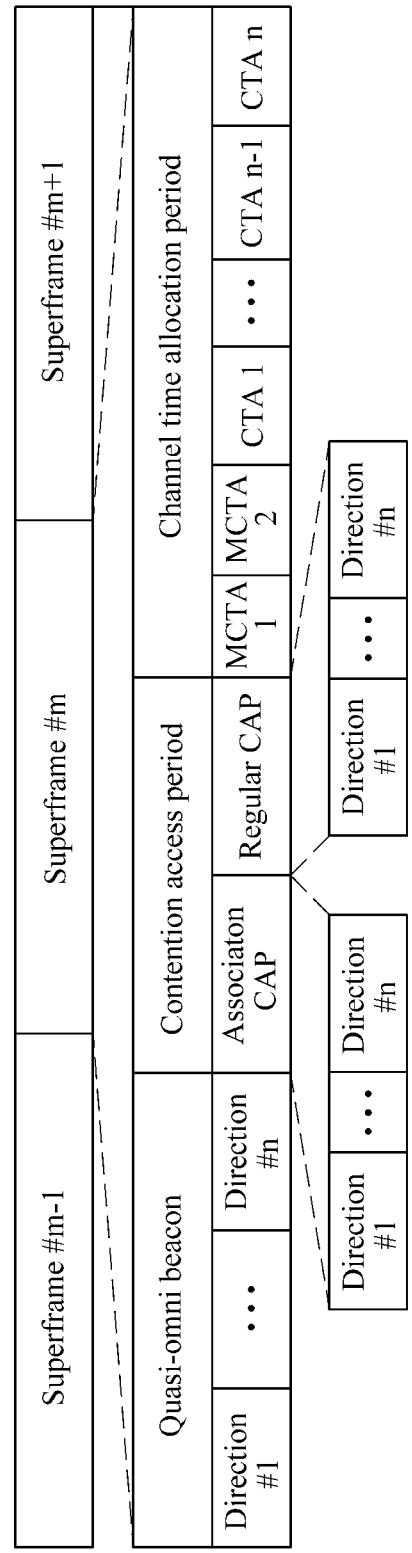
FIG. 1 is a diagram illustrating an example of a structure of a superframe in accordance with the IEEE 802.15.3c.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Embodiments to be described hereinafter are regarded as being implemented in a wireless communication network environment. Particularly, the embodiments are applicable to a wireless personal area network (WPAN) in which nodes located at short distances from one another perform data communication at low power. WPAN employs a time division multiple access (TDMA) scheme for the data communication between the nodes. The nodes willing to perform data communication occupy a channel exclusively for a channel time allocation period which is allocated by a node referred to as a piconet coordinator (PNC) to perform data communication. Further description on WPAN is disclosed in the Institute of Electrical and Electronics Engineers (IEEE) 802.15 family standard documents, and thus it will not be reiterated here.

In the embodiments described below, a millimeter wave (mm-wave) is used for wireless communication. The millimeter wave has a strong tendency to travel in a straight line and short propagation distance due to oxygen absorption and rainfall attenuation, and thus the line of sight should be ensured. To this end, a directional antenna having a high gain is employed in the embodiments described herein. A directional antenna emits transmission energy only in an intended direction, thereby increasing the propagation distance and achieving a high gain. In addition, the use of the directional antenna enables a spatial reuse, allowing several users in the same area to simultaneously perform communications with one another, thereby increasing the amount of data transceived between nodes. Hereinafter a resource allocation method using a directional antenna which is suitable for a wireless communication network will be described in detail with reference to accompanying drawings.

FIG. 1 illustrates an example of a structure of a superframe in accordance with the IEEE 802.15.3c.

Referring to FIG. 1, the resource allocation method is applied to a wireless communication network using a directional antenna. Although in FIG. 1, the IEEE 802.15.3c superframe is employed as an example to which the resource allocation method is applied, the network standards may not be limited thereto, and the resource allocation method is applicable to other network standards. The IEEE 802.15.3c superframe illustrated in FIG. 1 consists of three blocks including a beacon, a contention access period (CAP), and a channel time allocation period (CTAP). The beacon has control information described therein. A random access control is performed in the CAP. Data is stored for the duration of the CTAP.

According to the IEEE 802.15.3c, when individual nodes request a piconet coordinator (PNC) to allocate resources, the PNC performs resource scheduling to allocate wireless resources to the nodes. Then, the nodes use the allocated resources for data transmission therebetween.

Referring to the example illustrated in FIG. 1, the PNC allocates channel time to a plurality of nodes such that flows generated by the nodes can be concurrently transmitted group by group within CAPs of the channel time allocation period (CTAP) for which the corresponding nodes are allowed to transceiver data. For example, the PNC can use a directional antenna technique such as beamforming within the CAP, thereby allowing spatial reuse. Thus, within the CPA, the flows that do not interfere with one another can be transmitted concurrently. In this case, the PNC schedules channel time such that the flows between nodes do not influence one another and can use channels effectively. Although the concurrent transmission is available in both the CTA and the CTAP of the superframe structure, the example illustrated in FIG. 1 assumes that the concurrent transmission is performed within the CTAP.

In the structure of the superframe in accordance with the IEEE 802.15.3c as illustrated in FIG. 1, the PNC transmits a flow requested by each node within the CTAP. In this case, if a large number of requests have been received and the transmission time is long, all flows may not be completely transmitted within one superframe. Then, the respective nodes discard the remaining flows which have not been transmitted, or request a flow again in the next superframe. The maximum length of a superframe is 65,536 μsec according to the IEEE 802.15.3c, and the length may be adjustable by the PNC. In the example illustrated in FIG. 1, it is assumed that the length of the superframe is fixed to 65,536 μsec and the flows which are not transmitted within a current superframe are discarded.

In the example illustrated in FIG. 1, the PNC carries out resource scheduling, considering priority, channel efficiency, and fairness with respect to flows requested by the nodes. Specifically, the PNC makes a group of flows formed between nodes in an environment such as a wireless network using a directional beam which allows concurrent transmission through the same channel. Here, the PNC calculates transmission time for each flow and the number of flows able to be concurrently transmitted, and groups together the flows able to be concurrently transmitted based on the calculation result. The transmission time for each flow is equal to the amount of transmission or the amount of load when the transmission rate is fixed to 1 Gbps. The number of flows which can be concurrently transmitted is the number of different flows which are able to be transmitted concurrently. The PNC allocates the channel time to nodes such that the respective nodes can transmit flows belonging to the same group concurrently. Accordingly, the throughput (the amount of transmission/time) can be maximized.

FIGS. 2A to 2D show examples of exclusive regions (ERs) formed using a directional antenna. Referring to the example illustrated in FIGS. 2A to 2D, the ER using the directional antenna may be calculated by using equation 1 below.

$$r_{j,i} = \left(\frac{k_1 G_0 G_T(j) G_R(i) P_T(j)}{N_0 W}\right)^{1/\alpha} \quad (1)$$

where $G_T(j)$ and $G_R(i)$ represent, respectively, antenna gains of a transmitter node of a j flow and a receiver node of an i flow, and $r_{j,i}$ represents a distance between a transmitter node and a receiver node. $K_1$ represents a constant according to a propagation distance, $\alpha$ denotes path loss exponent dependent on a propagation environment, $P_r(j)$ represents transmitting power of a j flow, and $G_0$ represents a correlation coefficient between j and w flows.

Figure 2A:
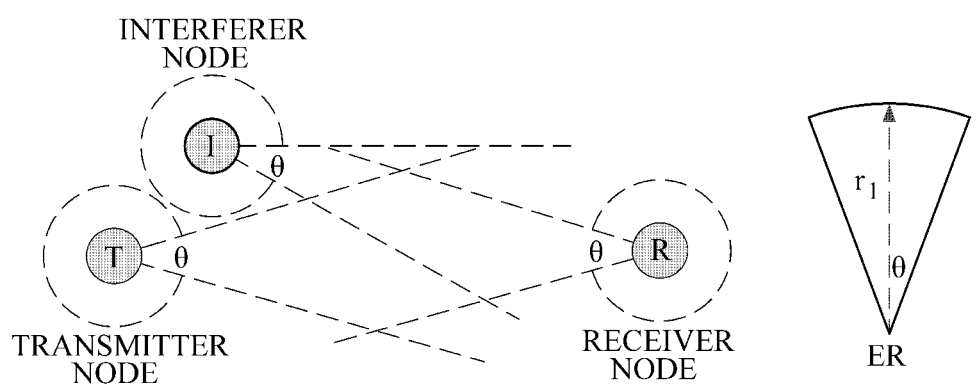
FIGS. 2A to 2D are diagrams of examples of an exclusive region (ER) formed using directional antennas.
Figure 2B:
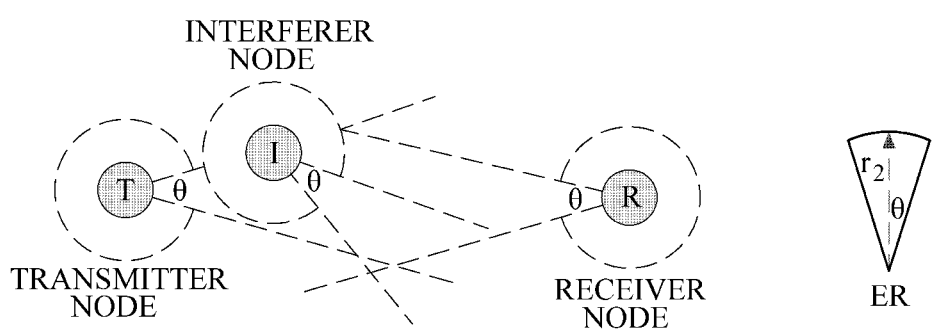
Figure 2C:
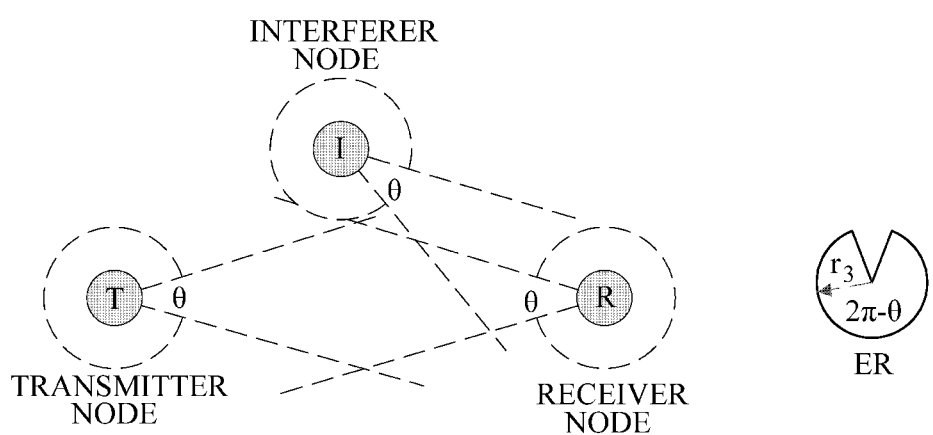
Figure 2D:
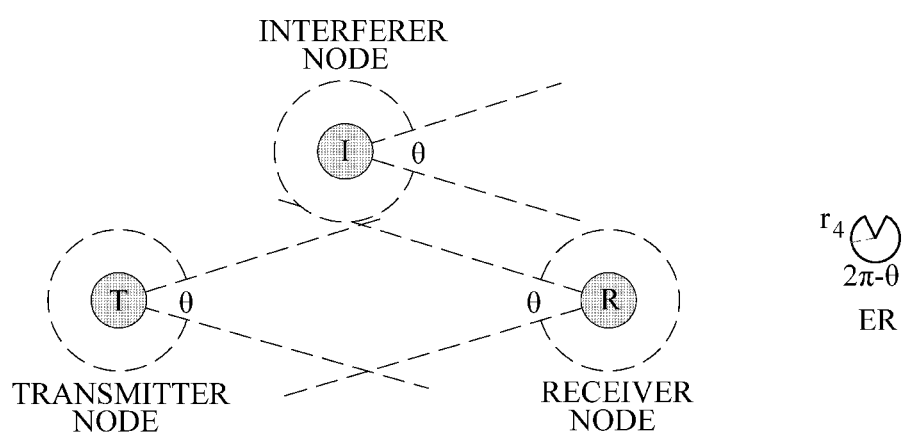

As shown in the examples shown in FIGS. 2A to 2D, four ERs are determined using the equation 1 in consideration of locations of the receiver node and an interfering node. FIG. 2A shows an exclusive region formed between main lobes of the receiver node and the interfering node, FIG. 2B shows an exclusive region formed between the main lobe of the receiver node and the side lobe of the interfering node, FIG. 2C shows an exclusive region formed between the side lobe of the receiver node and the main lobe of the interfering node, and FIG. 2D shows an exclusive region formed between the side lobes of the receiver node and the interfering node. Pairs of a transmitter node and a receiver node in a Piconet may be spatially grouped together for the simultaneous use of the same channel according to the exclusive region (ER) as defined in the examples shown in FIGS. 2A to 2D.

FIG. 3 illustrates a table showing spatial coordinates of flows and channel time allocation of each flow. Referring to the table shown in FIG. 3, the spatial coordinates of flows indicate a location of a pair of a transmitter node and a receiver node in a Piconet based on an exclusive region, and may be represented by complex numbers. In this case, it is assumed that all flows are transmitted and received at the same data rate.

To generate a group of flows for concurrent transmission, transmission time of each flow and the number of flows able to be simultaneously transmitted are taken into consideration. The table shown in FIG. 3 is made under the assumption that twenty nodes generate 10 flows.

Figure 4:
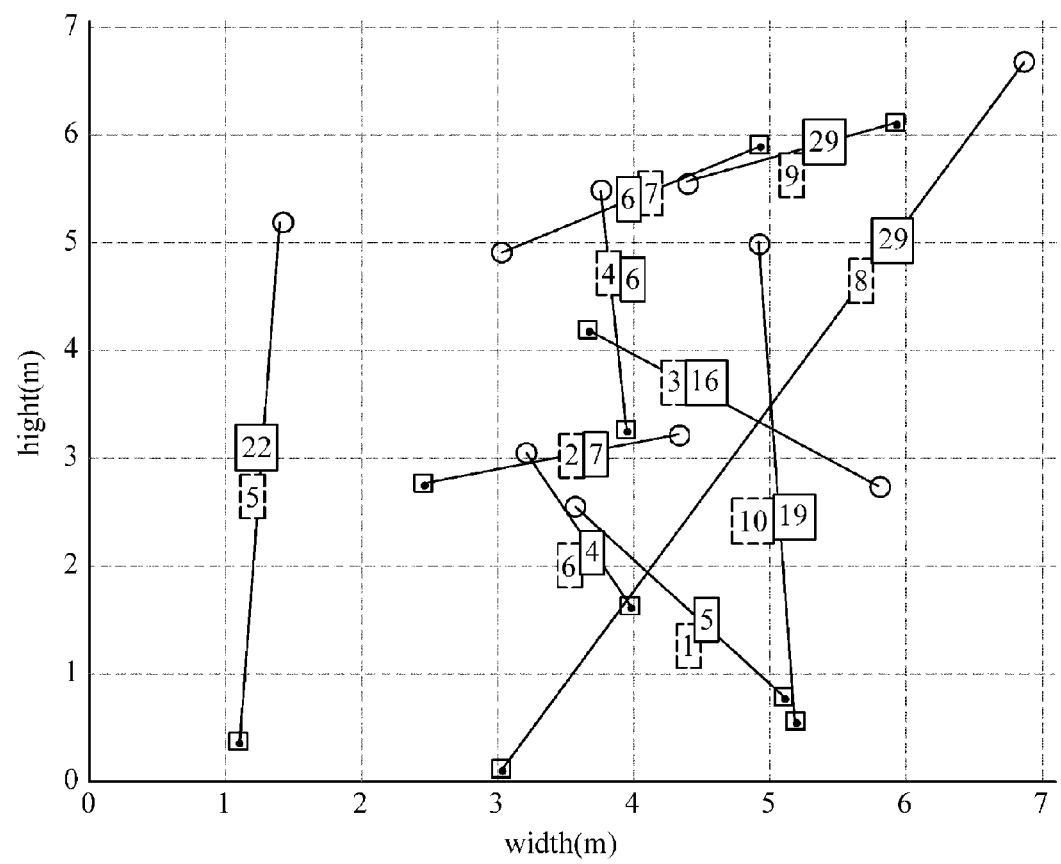
FIG. 4 is a graph showing distribution of the flows of the table in FIG. 3.

FIG. 4 illustrates a graph showing distribution of the flows of the table in FIG. 3. The flows of FIG. 3 are displayed in the graph shown in FIG. 4. In FIG. 4, numbers in rectangles of solid lines denote flow numbers and numbers in rectangles of dotted lines denote CTAs of the flows.

Like the table of FIG. 3, the graph shown in FIG. 4 is made under the assumption that twenty nodes generate ten flows in a wireless communication network environment. In addition, it is assumed that each node has the maximum propagation distance of 10 m and the nodes are located in a square area having a diagonal of 10 m. Also, it is assumed that each node generates packets according to poisson distribution. A packet occurrence probability (Ptx) may be obtained by using equation 2 below.

$$Ptx = 1 - \exp(-param.lambda \times param.superframe\_length) \quad (2)$$

where lambda is an arrival rate that indicates a packet occurrence frequency per msec and superframe_length is in the unit of msec. The packet occurrence probability is obtained by subtracting a probability of non-occurrence of a packet from the poisson distribution.

Figure 5:
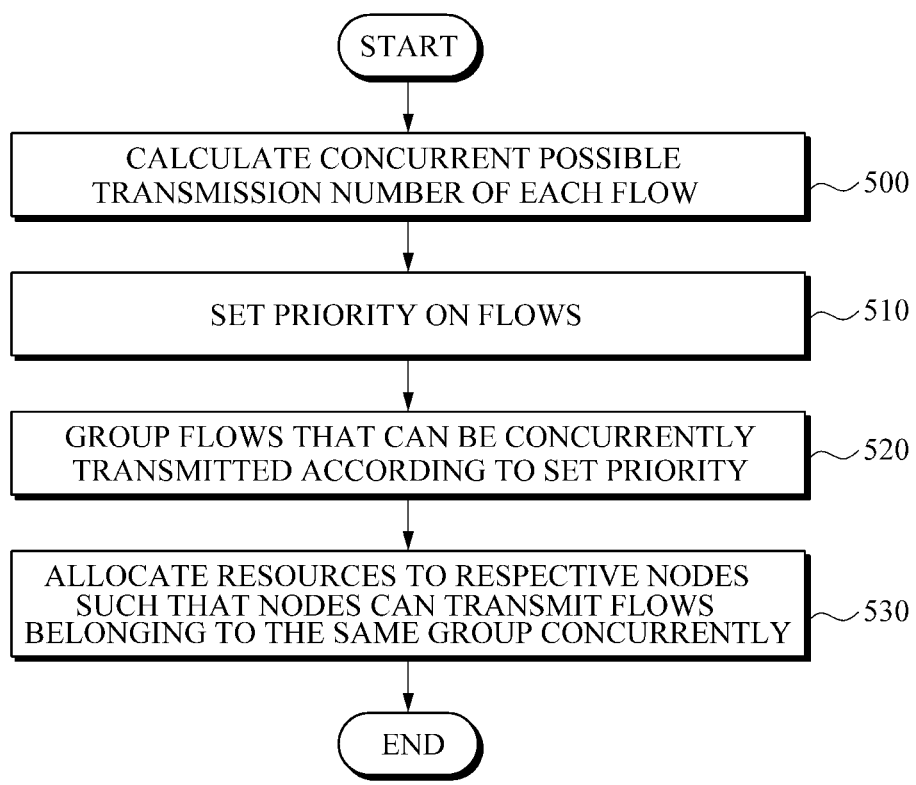
FIG. 5 is a flowchart of an example of a method of allocating resources by a coordinator device.

FIG. 5 illustrates a flowchart of an example of a method of allocating resources by a coordinator device.

Referring to FIG. 5, the coordinator device calculates transmission times of flows which are generated between a plurality of nodes and the number of flows able to be simultaneously transmitted (500). Then, the flows are grouped together based on the possibility of being simultaneously transmitted (520). In this case, the coordinator device sets priorities on the flows (510) to group the flows able to be simultaneously transmitted based on the set priorities (520). The coordinator device allocates the resources to the nodes such that the nodes can transmit the group of flows concurrently (540). The algorithm of the coordinator device for the group generation and conncurrent transmission scheduling is referred to as a fair concurrent transmission (FGCT) algorithm.

As one of concurrent transmission scheduling algorithms, a random concurrent transmission algorithm is to generate groups of flows to be concurrently transmitted with respect to all flows one by one. That is, starting from a specific flow, one group of flows to be concurrently transmitted is generated, and for the remaining flows which are not belonging to the generated group, another group of flows to be concurrently transmitted is generated to include the remaining flows. According to the above method, the first few groups are more likely to have most flows to be concurrently transmitted and the groups generated later are likely to have fewer flows than the previous groups. This is because while the first group is able to check the possibility of concurrent transmission for all flows, the following groups can check the possibility of concurrent transmission only for the remaining flows which are not included in the previous groups. This causes unfairness to the groups. Specifically, when a group has flows with different transmission times, the group leads to a lower channel efficiency compared to a group consisting of flows with similar transmission times.

However, the FGCT algorithm employed in the example shown in FIG. 5 is for rearranging the groups to increase fairness and channel efficiency. In the example, the coordinator device generates a concurrent transmission table that shows possibility of concurrent transmission of flows formed between a plurality of nodes. Hereinafter, the concurrent transmission table will be referred to as a REX_table. The REX_table is in the matrix form to indicate the possibility of a flow to be transmitted concurrently with other flows.

Thereafter, the coordinator device calculates the number of flows to be concurrently transmitted (hereinafter referred to as a "possible concurrent transmission number") based on the REX_table, and calculates the average of the possible concurrent transmission. The possible concurrent transmission number is the number of different flows that can be concurrently transmitted by a plurality of nodes. The possible concurrent transmission number may be obtained by adding numbers in each row that indicate whether a corresponding flow can be transmitted concurrently with another flow. In addition, the PNC may calculate average transmission time from the sum of the transmission times of all flows.

The PNC may set priorities on the flows and make groups of flows to be concurrently transmitted based on the priorities. Here, the PNC may give priority to flows having a transmission time greater than or equal to the average transmission time. Then, the remaining flows may be added to a previously generated group.

In one embodiment, the PNC may give priority to flows that have a possible concurrent transmission number greater than or equal to the average possible concurrent transmission number, and makes groups of the flows based on the priority. The remaining flows may be added to a previously generated group.

In another embodiment, the PNC may give priority to flows that have a transmission time greater than or equal to the average transmission time of the flows, and make a group of the flows having priority. Of the remaining flows, it may be determined whether they have a possible concurrent transmission number greater than or equal to an average possible concurrent transmission number of the remaining flows, and based on the determination result, the flows may be added to a previously generated group. Here, the above-described procedures are repeatedly performed in an alternating manner to generate the groups that include the remaining flows, or simply checks REX_table to add each of the remaining flows to the group to reduce complexity.

In other embodiment, the PNC may give priority to flows that have a possible concurrent transmission number greater than or equal to the average possible concurrent transmission number, and makes a group of the flows based on the priority. For the remaining flows, groups are generated by performing repeatedly the above procedures, or the REX_table is checked for each of the remaining flows to be added to an appropriate group.

Thereafter, the PNC allocates channel time to the nodes such that the respective nodes can concurrently transmit the flows belonging to the same group. The PNC may allocate the same channel time to the nodes of the flows belonging to the same group within the CTAP of a previously set transmission frame.

Data communication between a plurality of nodes according to resource allocation by the PNC in the wireless communication network using directional beam is described hereinafter. The plurality of nodes issues a request to the PNC for flows to be formed between the nodes. In response to the request, the PNC calculates a transmission time of each flow and the number of flows able to be transmitted concurrently with the each flow, and makes a group of flows able to be concurrently transmitted. In this case, the nodes are allocated with resources such that they can transmit concurrently the flows belonging to the same group. The nodes allocated with the resources perform data communication using the allocated resources.

Hereinafter, embodiments employing the FGCT algorithm described above will be described in detail.

FIG. 6 shows an example of a matrix of a concurrent transmission group using a CTA for each flow. Referring to FIG. 6, a PNC gives priority to flows that have a transmission time equal to or greater than an average transmission time of all flows, and makes a group of flows having priority.

For example, the transmission times (referred to as "CTA") of each flow shown in the example of FIG. 3 are as follows:

CTA=[5 7 16 6 22 4 6 29 29 19]

Thus, the average transmission time of the flows is 14.3 msec. Therefore, the PNC may give priority to the flows numbered 8, 9, 5, 3 and 10 in this order and group them together since each of the flows has a transmission time greater than or equal to the average transmission time, 14.3 msec. In FIG. 6, S_Fgroup represents an index matrix of a concurrent transmission group using transmission times of the respective flows, and S_CTA_Fgroup represents a transmission time matrix with respect to the flows of S_Fgroup.

FIG. 7 illustrates diagram of an example of a concurrent transmission table. Referring to FIG. 7, a PNC generates a concurrent transmission table, that is, a REX_table. The REX_table shows the possibility of a flow to be concurrently transmitted with other flows, and is obtained by applying a rule extraction (REX) algorithm on the flows shown in FIG. 3.

As shown in FIG. 7, each row and column of the table indicates a flow number. The first row indicates whether a flow numbered 1 can be transmitted concurrently with other flows. '0' indicates that the flow is not able to be transmitted concurrently with another flow, and '1' indicates that the flow is able to be transmitted concurrently with another flow. The REX_table is a matrix that is symmetric with respect to its main diagonal. However, this REX_table is not obtained under the assumption that flows on the same row are all present.

Thereafter, the PNC adds up values of each row to calculate the number of flows able to be transmitted concurrently, and uses the calculation result as an element for resource scheduling. That is, the number of flows able to be transmitted concurrently with each flow (hereinafter, referred to as a possible concurrent transmission number) is represented by the summation result of each row, and the possible concurrent transmission number of the flows shown in the example of FIG. 3 are as below.

[5 6 6 2 9 6 5 7 7 3]

For example, as shown in FIG. 7, the possible concurrent transmission number of the first row corresponding to a flow numbered 1 is 5 (=0+1+1+0+1+0+1+0+1+0).

Where the average of the possible concurrent transmission numbers of the flows is represented as avg_rex_flows, avg_rex_flows is 5.6 (=(5+6+6+2+9+6+5+7+7+3)/10). That is, on average, each flow can be transmitted concurrently with 5.6 flows without interference. In this case, the PNC compares the possible concurrent transmission number of each flow with the average possible concurrent transmission number to give priority to flows that have a greater possible concurrent transmission number than the average possible concurrent transmission number, and generates a group of the flows having priorities.

However, while the resource scheduling is available by use of the possible concurrent transmission number of each flow under the assumption that all flows have the same transmission time, if flows have different transmission times, the transmission time should be taken into consideration as well as the possible concurrent transmission number of each flow.

Through the FGCT algorithm as employed in the example of FIG. 5, the PNC compares the transmission time of each flow with the average transmission time and preferentially generates a group of flows each of which has a greater transmission time than the average transmission time, as shown in FIG. 6, and, adds the remaining flows to previously generated groups based on the possible concurrent transmission number of each flow.

FIG. 8 illustrates an example of a matrix of a concurrent transmission group based on the possible concurrent transmission number of each flow. Referring to FIG. 8, the PNC using the FGCT algorithm generates a group of flows each of which has a possible concurrent transmission number and a transmission time which are respectively greater than an average possible concurrent transmission number and an average transmission time. The average transmission time may be obtained from the amount of transmission or the amount of load which is the equal to the transmission time when the transmission rate of each flow is fixed to 1 Gbps. Then, the remaining flows are further added to previously generated other groups using a REX algorithm. If the remaining flows fail to be added to the existing groups, a new group is further generated. In sum, the FGCT algorithm allows giving priority to flows, generating a group of flows according to the priority, and adding the remaining flows having lower priorities to previously generated groups, thereby grouping all flows.

As shown in FIG. 8, through the FGCT algorithm, the flows may be sorted in the group according to the possible concurrent transmission number. For example, from among the remaining flows other than the flows numbered 8, 9, 5, 3, and 10 in the concurrent transmission group matrix of FIG. 6, a flow numbered 2 may be added to the concurrent transmission group matrix as shown in FIG. 8 since the flow has a greater possible concurrent transmission number than the average possible concurrent transmission number, 5.6. In FIG. 8, New_Fgroup represents an index matrix of a new possible concurrent transmission group including the flow numbered 2, and New_CTA_Fgroup represents a transmission time matrix with respect to the flows of New_Fgroup.

FIG. 9 illustrates an example of a matrix of a concurrent transmission group with respect to remaining flows.

Referring to FIG. 9, the PNC uses the FGCT algorithm to further assign the remaining flows to the matrix of the concurrent transmission group of FIG. 8. Here, Final_Fgroup represents an index matrix of a concurrent transmission group finally generated according to the FGCT algorithm, and Final_CTA_Fgroup represents a transmission time matrix with respect to the flows of Final_Fgroup. Referring again to FIG. 9, a first group includes flows numbered 8, 9, 5, 3, and 2, a second group includes flows numbered 10 and 6, a third group includes flows numbered 7 and 1, and a fourth group includes a flow numbered 4.

Figure 10:
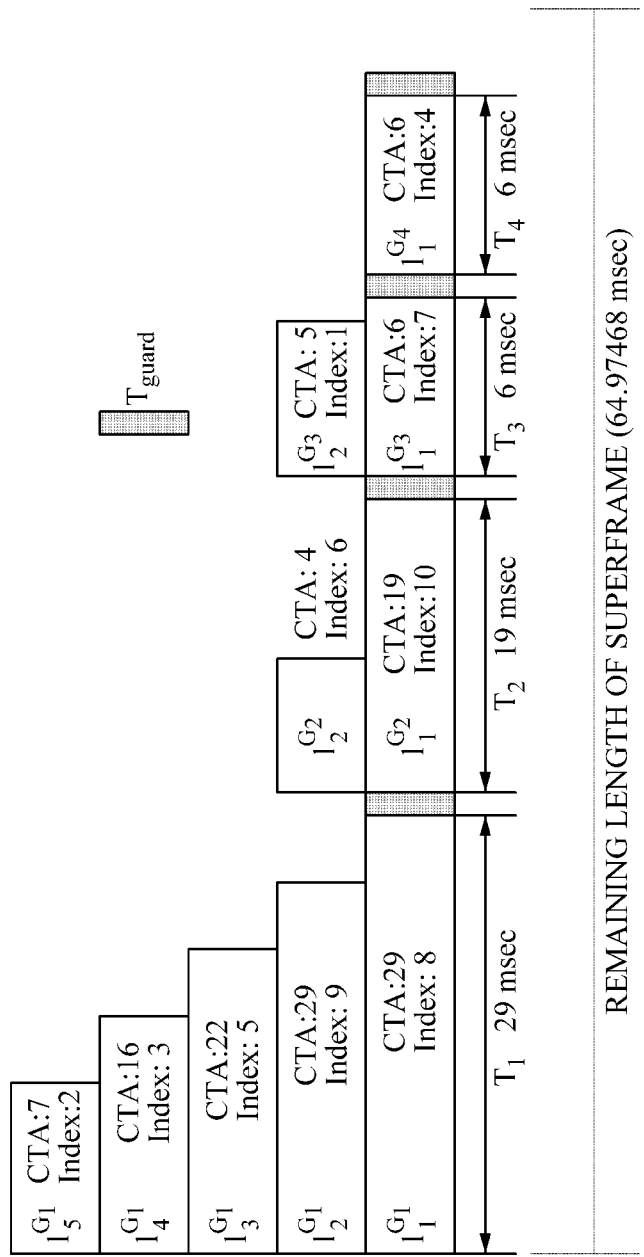
FIG. 10 illustrates an example of group transmission status within a superframe when a Piconet coordinator (PNC) performs resource allocation.

FIG. 10 illustrates an example of group transmission status within a superframe when a PNC performs resource allocation.

Referring to the example shown in FIG. 10, if a length of the superframe is 64.97468 msec, flows numbered 8, 9, 5, 3, and 2 belonging to a first group are concurrently transmitted for 29 msec, flows numbered 10 and 6 belonging to a second group are concurrently transmitted for 19 msec, flows numbered 7 and 1 belonging to a third group are concurrently transmitted for 6 msce, and a flow numbered 4 belonging to a fourth group is transmitted for 6 msec. The length of the superframe required for the flows belonging to the first to fourth groups is 64 msec, and the previously defined length of the superframe, which is 64.97468 msec, satisfies the required length.

As shown in FIG. 10, according to the FGCT algorithm, a total of four groups may be allocated with channel time within a previously set superframe. Thus, the FGCT algorithm may produce more groups compared to the RANCT algorithm which generates groups (3 groups) at random. Furthermore, according to the FGCT algorithm, a waste length of the previously set superframe is only 0.97468 msec, which is substantially smaller than the case where the RANCT algorithm is used. The above examples described with reference to FIGS. 6 to 10 are not limited thereto, and it will be understood that various modification will be made.

Figure 11:
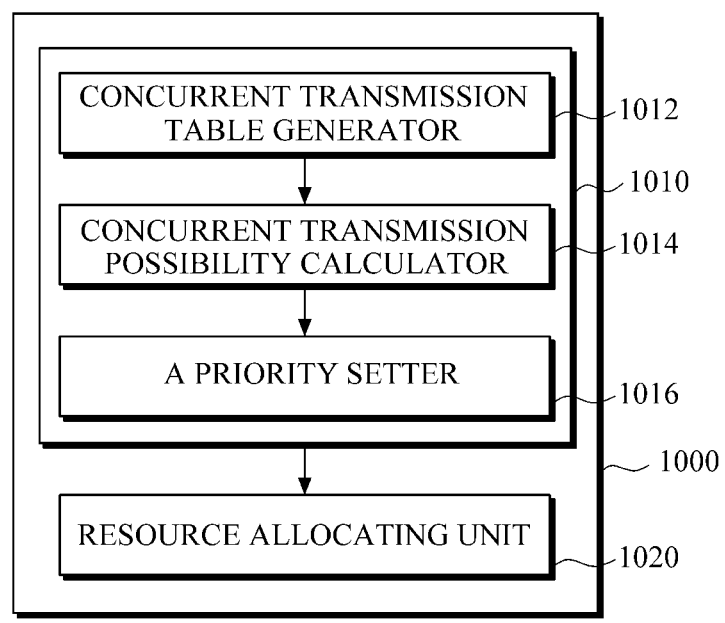
FIG. 11 illustrates a diagram of an example of a configuration of a coordinator device.

FIG. 11 illustrates a diagram of an example of a configuration of a coordinator device. Referring to FIG. 11, the coordinator device 1000 may include a flow grouping unit 1010 and a resource allocating unit 1020. The flow grouping unit 1010 may include a concurrent transmission table generator 1012, a concurrent transmission possibility calculator 1014, and a priority setter 1016.

The coordinator device 1000 allocates resources to a plurality of nodes using a directional beam in a wireless communication network. At this time, the flow grouping unit 1010 calculates a transmission time of each flow generated between adjacent nodes and the number of flows able to be transmitted concurrently with the each flow (hereinafter, referred to as a "possible concurrent transmission number"). Then, the flow grouping unit 1010 generates a group of flows based on the calculated transmission time and the possible concurrent transmission number of each flow. The flow grouping unit 1010 includes remaining flows in the previously generated group and performs further grouping with the remaining flows based on the transmission time and the possible concurrent transmission number of each remaining flow. In addition, the flow grouping unit 1010 may transmit flows belonging to the same group concurrently with each other within the same channel time allocation period of a previously set transmission frame.

More specifically, the concurrent transmission table generator 1012 of the flow grouping unit 1010 generates a concurrent transmission table showing whether each flow can be transmitted concurrently with another flow. The concurrent transmission possibility calculator 1014 calculates the number of flows able to be transmitted concurrently with each flow using the concurrent transmission table.

The priority setter 1016 sets a priority for grouping of flows based on the possible concurrent transmission number and transmission time of each flow. The priority setter 1016 may gives priority to flows that have the possible concurrent transmission number equal to or greater than an average possible concurrent transmission number or the transmission time equal to or greater than an average transmission time.

The resource allocating unit 1020 allocates resources to the nodes such that the nodes can concurrently transmit the flows belonging to the same group. The resource allocating unit 1020 may allocate the nodes that generate flows belonging to the same group with the same channel time within the channel time allocation period of the previously set transmission frame.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a coordinator device allocating resources to a plurality of nodes using a directional beam in a wireless communication network, the method comprising:

calculating a number of flows able to be transmitted concurrently with each flow which is generated between the nodes and transmission time of each flow, and grouping the flows that can be concurrently transmitted based on a calculation result;

allocating resources to respective nodes such that nodes which generate the flows belonging to a same group can concurrently transmit the flows; and setting a priority based on the calculated number of flows able to be concurrently transmitted and the transmission time of each flow and grouping the flows that can be concurrently transmitted based on the set priority, wherein the grouping of the flows based on the set priority includes:

giving priority to flows, each of which has a transmission time equal to or greater than an average transmission time of the flows and grouping the flows having the priority;

further grouping remaining flows by adding flows having a transmission time equal to or greater than an average transmission time of the remaining flows to a previously generated group;

giving priority to flows, each of which has the number of flows able to be concurrently transmitted equal to or greater than an average number of flows able to be concurrently transmitted and grouping the flows having the priority; and further grouping remaining flows by adding each of the remaining flows to a previously generated group.

2. The method of claim 1, wherein the grouping of the flows based on the set priority includes:

further grouping remaining flows by adding each of the remaining flows to a previously generated group based on the number of flows able to be concurrently transmitted which is equal to or greater than the average number of flows able to be concurrently transmitted.

3. The method of claim 1, wherein the grouping of the flows based on the set priority includes:

further grouping remaining flows by adding each of the remaining flows to a previously generated group based on the transmission time which is equal to or greater than the average transmission time.

4. The method of claim 1, wherein the grouping of the flows that can be concurrently transmitted includes generating a concurrent transmission table that indicates whether each flow can be concurrently transmitted with another flow and calculating the number of flows able to be concurrently transmitted using the generated concurrent transmission table.

5. The method of claim 4, wherein the concurrent transmission table is provided in a matrix form to indicate whether each flow can be transmitted concurrently with another flow and the number of flows able to be concurrently transmitted is obtained by adding up values in each row corresponding to each flow wherein the values indicate whether each flow can be concurrently transmitted with the other flow.

6. The method of claim 1, wherein wireless communication in the wireless communication network is performed using a millimeter-wave.

7. The method of claim 1, wherein the allocating of the resources to the respective nodes includes allocating a same channel time to the nodes that generate flows belonging to the same group within a channel time allocation period of a previously set transmission frame.

8. A method of data communications between a plurality of nodes using a directional beam in a wireless communication network, the method comprising:
   issuing a request to a coordinator device for flows to be generated between the nodes;
   in response to the request, the coordinator device calculating the number of flows able to be concurrently transmitted and a transmission time of each flow, prioritizing flows based on the number and grouping the prioritized flows, and allocating resources to the respective nodes such that the nodes which generate the flows belonging to the same group can transmit the flows concurrently; and
   performing data communications between the nodes using the allocated resources;
   wherein the grouping of the prioritized flows includes:
   giving priority to flows, each of which has a transmission time equal to or greater than an average transmission time of the flows and grouping the flows having the priority;
   further grouping remaining flows by adding flows having a transmission time equal to or greater than an average transmission time of the remaining flows to a previously generated group;
   giving priority to flows, each of which has the number of flows able to be concurrently transmitted equal to or greater than an average number of flows able to be concurrently transmitted and grouping the flows having the priority; and
   further grouping remaining flows by adding each of the remaining flows to a previously generated group.

9. The method of claim 8, wherein wireless communications in the wireless communication network is performed using a millimeter-wave.

10. The method of claim 8, wherein the allocating of the resources to the respective nodes includes allocating a same channel time to the nodes that generate the flows belonging to the same group within a channel time allocation period of a previously set transmission frame.

11. A coordinator device which allocates resources to a plurality of nodes using a directional beam in a wireless network, the coordinator device comprising:
   a processor and a memory;
   a flow grouping unit configured to calculate a number of flows able to be transmitted concurrently with each flow which is generated between the nodes and transmission time of each flow and group together the flows that can be concurrently transmitted based on a calculation result;
   a resource allocating unit configured to allocate resources to respective nodes such that nodes which generate the flows belonging to a same group can concurrently transmit the flows; and
   a priority setter configured to set a priority based on the calculated number of flows able to be concurrently transmitted and the transmission time of each flow such that the flows able to be concurrently transmitted can be grouped together according to the set priority;
   wherein grouping together according to the set priority includes:
   giving priority to flows, each of which has a transmission time equal to or greater than an average transmission time of the flows and grouping the flows having the priority;
   further grouping remaining flows by adding flows having a transmission time equal to or greater than an average transmission time of the remaining flows to a previously generated group;
   giving priority to flows, each of which has the number of flows able to be concurrently transmitted equal to or greater than an average number of flows able to be concurrently transmitted and grouping the flows having the priority; and
   further grouping remaining flows by adding each of the remaining flows to a previously generated group;
   wherein the flow grouping unit, the resource allocating unit and the priority setter are implemented by the processor.

12. The coordinator device of claim 11, wherein the flow grouping unit includes:
   a concurrent transmission possibility calculator configured to calculate the number of flows able to be transmitted concurrently with each flow generated between the nodes.

13. The coordinator device of claim 12, wherein the flow grouping unit further includes a concurrent transmission table generator that generates a concurrent transmission table which indicates whether each flow can be concurrently transmitted with another flow and the concurrent transmission possibility calculator calculates the number of flows able to be concurrently transmitted using the generated concurrent transmission table.

14. The coordinator device of claim 11, wherein the resource allocating unit allocates the same channel time to the nodes that generate flows belonging to a same group within a channel time allocation period of a previously set transmission frame.

15. The coordinator device of claim 11, wherein wireless communications in the wireless communication network is performed using a millimeter-wave.

* * * * *